(12) United States Patent
Reischauer et al.

(10) Patent No.: US 12,202,711 B2
(45) Date of Patent: Jan. 21, 2025

(54) METHOD FOR DETERMINING A LOAD, CONTROLLER FOR A HYDRAULIC LIFTING DEVICE FOR CARRYING OUT A METHOD OF THIS TYPE

(71) Applicant: Palfinger AG, Bergheim (AT)

(72) Inventors: Richard Reischauer, Schalchen (AT); Alexander Schalber, Anif (AT); Dominik Graml, Hallwang bei Salzburg (AT)

(73) Assignee: PALFINGER AG, Bergheim (AT)

( * ) Notice: Subject to any disclaimer, the term of this patent is extended or adjusted under 35 U.S.C. 154(b) by 1604 days.

(21) Appl. No.: 16/380,472

(22) Filed: Apr. 10, 2019

(65) Prior Publication Data

US 2019/0233258 A1    Aug. 1, 2019

Related U.S. Application Data

(63) Continuation of application No. PCT/AT2017/060250, filed on Oct. 5, 2017.

(30) Foreign Application Priority Data

Oct. 14, 2016  (AT) .......................... GM 50213/2016

(51) Int. Cl.
*B66C 23/90* (2006.01)
*G01G 19/14* (2006.01)

(52) U.S. Cl.
CPC ............. *B66C 23/90* (2013.01); *G01G 19/14* (2013.01)

(58) Field of Classification Search
CPC ...... G01G 19/14; B66C 23/90; B66C 23/905; B66C 23/54
See application file for complete search history.

(56) References Cited

U.S. PATENT DOCUMENTS 3,870,162 A    3/1975  Nakajo
4,081,554 A    3/1978  Cragoe, Jr. et al.
(Continued)

FOREIGN PATENT DOCUMENTS

CN    1136304    11/1996
CN    1139413    1/1997
(Continued)

OTHER PUBLICATIONS

International Search Report issued Jan. 1, 2018 in International (PCT) Application No. PCT/AT2017/060250.
(Continued)

*Primary Examiner* — Lam S Nguyen
(74) *Attorney, Agent, or Firm* — Wenderoth, Lind & Ponack, L.L.P.

(57) ABSTRACT

In a method for determining a load that is lifted or to be lifted by a hydraulic lifting device, for the determining the load lifted or to be lifted, in a reference phase, the lifting device is moved into a reference position in a first loading state of the lifting device. A first detection of the forces currently acting on the lifting device and the current geometry of the lifting device occurs in the reference position. In a measurement phase, the lifting device is moved into a measurement position in a second loading state, and a second detection of the forces currently acting on the lifting device and the current geometry of the lifting device occurs in the measurement position. In a comparison phase, the lifted load is characterized by a comparison of the respective detected forces currently acting on the lifting device and the respective detected current geometry of the lifting device.

24 Claims, 14 Drawing Sheets

(56) References Cited

U.S. PATENT DOCUMENTS

| | | |
|---|---|---|
| 5,518,129 A | 5/1996 | Sieberer |
| 5,711,440 A | 1/1998 | Wada |
| 7,523,835 B2 | 4/2009 | Andersson |
| 8,271,229 B2 | 9/2012 | Hsu et al. |
| 8,793,011 B2 | 7/2014 | Schneider et al. |
| 9,630,822 B2 | 4/2017 | Ellis et al. |
| 9,783,397 B2 | 10/2017 | Terata et al. |
| 2006/0045661 A1 | 3/2006 | Andersson |
| 2008/0319710 A1 | 12/2008 | Hsu et al. |
| 2011/0062104 A1 | 3/2011 | Schneider et al. |
| 2013/0292190 A1 | 11/2013 | Havimäki |
| 2015/0027789 A1 | 1/2015 | Ellis et al. |
| 2016/0318739 A1 | 11/2016 | Terata et al. |

FOREIGN PATENT DOCUMENTS

| | | |
|---|---|---|
| CN | 104340104 | 2/2015 |
| EP | 0 353 099 | 1/1990 |
| EP | 0 728 696 | 8/1996 |
| EP | 1 477 452 | 11/2004 |
| EP | 2 489 625 | 8/2012 |
| EP | 2 947 035 | 11/2015 |
| EP | 2 982 635 | 2/2016 |
| FR | 2 156 824 | 1/1973 |
| GB | 1 411 274 | 10/1975 |
| JP | 48-52268 | 7/1973 |
| JP | 51-141152 | 12/1976 |
| JP | 07-125987 | 5/1995 |
| JP | 8-12274 | 1/1996 |
| JP | 08-59187 | 3/1996 |
| JP | 2002-241083 | 8/2002 |
| JP | 2006-200251 | 8/2006 |
| JP | 2014-201383 | 10/2014 |
| KR | 1995-0702935 | 8/1995 |
| KR | 10-2011-0030357 | 3/2011 |
| WO | 93/08116 | 4/1993 |
| WO | 95/13241 | 5/1995 |
| WO | 2008/140336 | 11/2008 |

OTHER PUBLICATIONS

Search Report issued May 9, 2017 in Austrian Application No. GM 50213/2016, with English translation.

METHOD FOR DETERMINING A LOAD, CONTROLLER FOR A HYDRAULIC LIFTING DEVICE FOR CARRYING OUT A METHOD OF THIS TYPE

BACKGROUND OF THE INVENTION

The invention concerns a method of determining a load which is lifted or which is to be lifted by a hydraulic lifting apparatus, a control means for a hydraulic lifting apparatus adapted for carrying out such a method and a hydraulic lifting apparatus having such a control means.

A method of the general kind set forth for determining a load which is lifted or which is to be lifted by a hydraulic lifting apparatus is known from EP 1 477 452 B1. In the method described therein for a crane with manually actuated or hydraulic jib elements, for the purpose of weighing a load which is to be mounted to a manual jib element of a crane, firstly the crane is moved into a predetermined position in a sampling phase. That predetermined position can be suitable for load pickup. Thereupon, in relation to the manually actuated jib element mounted to the crane, pressure measurements are carried out on the main cylinder for various, specifically at least two, positions of the hydraulic jib elements between completely retracted and completely extended hydraulic jib elements and a sample diagram for that predetermined crane position is generated therefrom. That sampling phase takes place at the crane manufacturer.

In a further phase a load mounted to a manually actuated jib element is determined. For that purpose the unloaded crane is moved into the predetermined position suitable for load pickup. Determining the pressure in the main cylinder and comparison with the sample diagram concerning that position provides the cantilever of the attachment point of the load to be fitted (length of the load arm). After attachment of the load the load can be determined from the difference between the detected pressure in the unloaded and in the loaded state of the crane.

A disadvantage with that method known from the state of the art is that the operation of determining a load can in principle only be effected in a predetermined position of the crane. Before a load is picked up the crane must be moved into a position for which a sample diagram was recorded by the crane manufacturer. After a load is picked up the crane must also be in the appropriate position for determining the load. The operation of determining a load can moreover be effected only in the configuration (layout) of the crane in which implementation of the sampling phase, that is to say the recording of a sample diagram, was effected by the crane manufacturer. Upon a change in the crane configuration or layout it can therefore happen that the sample diagrams recorded by the crane manufacturer can no longer be utilised for determining a load.

The object of the invention is to provide a method of determining a load which is lifted or is to be lifted by a hydraulic lifting apparatus, in which the above-mentioned disadvantages do not arise.

SUMMARY OF THE INVENTION

The above object is attained by a method described below, a control means (controller) adapted for carrying out such a method, and a hydraulic lifting apparatus having such a control means.

As in the method of the general kind set forth for determining a load which is lifted or is to be lifted by a hydraulic lifting apparatus, for example in the form of a hydraulic loading crane, the lifting apparatus is firstly moved into a reference position in a reference phase. In that case the lifting apparatus can be in a first loading state.

In contrast to the method known in the state of the art however, the method according to the invention provides that a first detection of the forces currently acting on the lifting apparatus and the current geometry of the lifting apparatus is now effected in the reference position of the reference phase. By virtue of the detection of the forces currently acting on the lifting apparatus and the current geometry of the lifting apparatus, the current crane configuration or crane layout the current geometry (position) in which the lifting apparatus is disposed can be taken into account in determining a load which is lifted or is to be lifted. Accordingly, even the current (first) loading state of the lifting apparatus can also be taken into consideration. In other words an operation of determining a load which is lifted or is to be lifted is now made possible, on the basis of the currently prevailing operating parameters of the lifting apparatus. Thus for example operating parameters of the lifting apparatus, which currently prevail in operation, can be detected as a starting point for determining a load which is lifted or is to be lifted.

In the method according to the invention there then follows a measurement phase in which the lifting apparatus is in a second loading state and the lifting apparatus is moved into a measurement position. In the measurement position a second detection of the forces currently acting on the lifting apparatus and the current geometry of the lifting apparatus is effected. Similarly to the first detection operation, an operation for determining a load which is lifted or is to be lifted can be effected, with the involvement of the currently prevailing operating parameters of the lifting apparatus.

In a comparison phase following the first and second operations for determining the forces acting on the lifting apparatus and the geometry of the lifting apparatus, the lifted load is characterized by a comparison of the respective detected forces currently acting on the lifting apparatus and the respective detected current geometry of the lifting apparatus. As the comparison of the detected forces and the detected geometries (positions) is based on the respective currently prevailing operating parameters, the load which is lifted or is to be lifted can be very precisely characterized. Thus for example the measurement phase can be carried out directly after the reference phase, whereby differences arising in the comparison phase in respect of the detected forces can be attributed directly to a change in the loading state of the lifting apparatus, in which case changes in the respectively detected or prevailing geometry can also be taken into account in characterising the load.

For determining a load which is lifted or is to be lifted by the lifting apparatus therefore there is no reliance on a sampling phase to be carried out by the crane manufacturer and sample diagrams which are linked thereto and which can be limitedly used, in the sense of the state of the art. For the crane manufacturer themselves a method according to the invention makes it possible to dispense with the time-consuming implementation of a sampling phase. A method according to the invention also makes it possible for example to easily take account of ageing and wear phenomena of the lifting apparatus in determining a load which is lifted or is to be lifted by the lifting apparatus.

The possibility of carrying out the measurement phase substantially as often as desired after carrying out the reference phase is not to be excluded.

It is advantageous in that respect that the reference position corresponds to a freely selectable position of the lifting apparatus. Implementation of the method can thus be effected starting from substantially any position of the lifting apparatus. That can make it possible that the lifting apparatus does not have to be moved into a predetermined position specifically before carrying out the reference phase.

It can generally be advantageous if the measurement position corresponds to a position of the lifting apparatus after a load pickup or a load setdown. In that case the measurement position can correspond to a position of the lifting apparatus immediately after picking up or setting down a load. The measurement position can also correspond to a position of the lifting apparatus which occurs by a (possibly slight) change in position directly after a load is picked up or set down.

It can be advantageous if the measurement position corresponds to a position of the lifting apparatus, approximated to the reference position of the lifting apparatus. By virtue thereof differences occurring in the comparison phase in respect of the detected forces can be for a large part attributed to a change in the loading state of the lifting apparatus by virtue of the load which is lifted or is to be lifted. Changes in the detected forces by virtue of a change in the geometry, for example caused by a change in extension, can in that case provide a smaller proportion. An approach of the measurement position to the reference position can occur for example by the lifting apparatus for picking up or setting down a load being moved out of the reference position and by the position of the lifting apparatus then being moved back in the direction of the reference position for carrying out the measurement phase.

It can be advantageous for the measurement position of the lifting apparatus to substantially correspond to the reference position. By virtue thereof differences in the detected forces, that occur in the comparison phase, can be attributed substantially to a change in the loading state of the lifting apparatus by the load which is lifted or is to be lifted.

It can further be advantageous if the reference position corresponds to a position approximated to an intermediate position, wherein the intermediate position is a position of the lifting apparatus, that is suitable for load pickup or load setdown. That can be advantageous if for example the position of the lifting apparatus in which a lifted load is to be determined is not suitable for load pickup or set down. That can also make it possible for the reference position and also the measurement position to be away from the intermediate position suitable for load pickup or load set down.

In that respect, it can be advantageous if transfer of the lifting apparatus out of the reference position into the intermediate position and transfer of the lifting apparatus out of the intermediate position into the measurement position is effected with a change in position of the lifting apparatus, that is within a tolerance range. Upon changes in position of the lifting apparatus within the tolerance range it can be possible that the forces detected in the reference phase and the detected geometry can still be used for determining the load which is lifted or is to be lifted in the measurement phase. Therefore after carrying out the reference phase substantially any changes in position of the lifting apparatus, that are within the tolerance range, can be carried out without renewed implementation of the reference phase being necessary before carrying out the measurement phase. In that case, when carrying out the measurement phase, the measurement position can also differ from the reference position within the tolerance range.

It can be advantageous that prior to each implementation of the measurement phase for detection of the forces currently acting on the lifting apparatus in the second loading state and the current geometry of the lifting apparatus an implementation of the reference phase is effected for detecting the forces currently acting on the lifting apparatus in the first loading state and the current geometry of the lifting apparatus. In other words it is provided that, before any load pickup or load set down of the lifting apparatus, the reference phase is carried out. Implementation of the measurement phase can be effected substantially as often as desired after carrying out the reference phase. It should also not be excluded that implementation of the measurement phase can be effected as often as may be desired after a change in position of the lifting apparatus, that is within the tolerance range.

Detection of the forces currently acting on the lifting apparatus and the current geometry of the lifting apparatus can be effected with involvement of parameters characteristic of the respective position of the lifting apparatus and the respective loading state of the lifting apparatus, and a calculation model. The characteristic parameters in that case can correspond to the forces acting on the lifting apparatus and the geometry of the lifting apparatus. Information relating to the lifting apparatus, like for example its possible and also current configuration or layout, can be stored in the calculation model.

The lifting apparatus can have at least one crane column rotatable about a vertical axis of rotation and a main arm mounted to the crane column pivotably about a first horizontal pivot axis. In addition the lifting apparatus can have at least one hydraulic main cylinder for the pivotal movement of the main arm, wherein in the reference phase and the measurement phase the moment is detected in relation to the first horizontal pivot axis. In a simple case for example with incorporation of the pivotal angle and the length of the main arm and the pressure detected in the main cylinder, it is possible to determine the moment in relation to the first horizontal pivot axis.

In regard to the lifting apparatus it can further be provided that it has a rotary mechanism for rotation of the crane column and an articulated arm mounted to the main arm pivotably about a second horizontal axis of rotation and with preferably at least one crane extension arm, wherein the lifting apparatus further has a first hydraulic articulation cylinder for the pivotal movement of the articulated arm and preferably at least one first hydraulic extension cylinder for actuation of the at least one crane extension arm. Such a configuration can be involved for example when the lifting apparatus is in the form of an articulated arm crane.

In detection of the forces currently acting on the lifting apparatus and the current geometry of the lifting apparatus it can be provided that the characteristic parameters include at least the pressure in the at least one main cylinder and/or the pressure in the articulation cylinder and/or the rotary angle of the rotary mechanism and/or the articulation angle of the main arm relative to the crane column and/or the articulation angle of the articulated arm relative to the main arm and/or the extension position of the at least one crane extension arm. The forces and the geometry can be completely and precisely detected by a suitable selection of the characteristic parameters.

In that respect it can further be advantageous if the lifting apparatus further has an attachment articulated arm mounted to the articulated arm pivotably about a third horizontal pivot axis and having at least one crane extension arm, wherein the lifting apparatus further has at least one second hydraulic articulation cylinder for the pivotal movement of the attachment articulated arm and a second hydraulic extension cylinder for actuation of the at least one crane extension arm and the characteristic parameters further include the pressure in the second articulation cylinder and/or the articulation angle of the attachment articulated arm relative to the articulated arm and/or the extension position of the at least one crane extension arm of the attachment articulated arm. Such a configuration can occur for example when the lifting apparatus is in the form of an articulated arm crane with an attachment articulated arm. In that respect it can be provided that in the reference phase and the measurement phase the moment is detected in relation to the first horizontal pivot axis and the moment is detected in relation to the third horizontal pivot axis. With corresponding detection of the geometry the load which is lifted or is to be lifted can however also be determined by sole detection of the moment in relation to the first horizontal pivot axis. In the case of additional detection of the moment with respect to the third horizontal pivot axis however it can also be possible to more precisely characterize the load which is lifted or is to be lifted.

In that respect, it can further be advantageous if the lifting apparatus further has at least one fly jib and the additional displacement of the at least one fly jib is incorporated in the calculation model. Data relevant to the fly jib can be stored in the calculation model. Such a possibly manually actuated fly jib can be used to increase the reach of a crane arm or crane extension arm of the lifting apparatus. The fly jib can be arranged at a predeterminable angle, for example by means of an adjusting device, on a crane arm or crane extension arm of the lifting apparatus.

It can further be advantageous in that respect if the lifting apparatus further has a working device arranged on the lifting apparatus, in particular on a crane extension arm, and the additional loading due to the working device is incorporated in the calculation model. A working device like for example a cable winch can in that case be arranged at substantially any location on the lifting apparatus. A working device like for example a gripping means can however also be arranged on a crane extension arm of the lifting apparatus. Data relevant to the working device can be stored in the calculation model, but that is not absolutely necessary. By virtue of detection of the forces currently acting on the lifting apparatus in the first loading state and the current geometry of the lifting apparatus it is also possible for the working device and possibly also the position thereof on or in relation to the lifting apparatus to be taken into account in determining the load which is lifted or is to be lifted.

It can be advantageous if deformation of the lifting apparatus is incorporated in the calculation model. Deformation of the lifting apparatus caused by the inherent weight and/or the load which is lifted or is to be lifted can influence the actual geometry of the lifting apparatus in a position or a loading state thereof. The load which is lifted or is to be lifted can be more precisely determined by incorporation of the deformation of the lifting apparatus in the calculation model.

In that respect it can be advantageous that the deformation of the crane column and/or the main arm and/or the articulated arm and/or the at least one crane extension arm of the lifting apparatus are incorporated in the calculation model, whereby the actual geometry of the lifting apparatus can be better characterized in a position or a loading state of the lifting apparatus. Similarly thereto, incorporating the influence of seal frictions of the hydraulic cylinders can allow the load which is lifted or is to be lifted to be more accurately determined.

In that respect, it can be advantageous if in the calculation model the deformation is applied in the form of a correction to detected articulation angles and/or in the form of a correction to detected extension positions, and/or the influence of the seal frictions is applied in the form of a correction to detected pressures. By virtue thereof for example the deformation occurring for a given position of the lifting apparatus and the hydraulic pressure which occurs for a given loading state or also for a given position can be taken into consideration in the calculation model.

In that respect, it can further be advantageous if the correction is effected in dependence on the detected forces currently acting on the lifting apparatus and/or detected articulation angles and/or the detected extension positions. In that way it is possible not only to take account of a position-dependent or geometry-dependent deformation of the lifting apparatus, but that can also be effected (possibly also in combination) in dependence on the load which is lifted or is to be lifted. The deformation caused by the layout or configuration of the lifting apparatus can also be taken into account. In other words the extent of the corrections themselves can be in a given dependency on the detected parameters.

In that respect, it can further be advantageous if the correction for the deformation is effected in linear dependency in respect of the detected pressure and/or in linear dependency in respect of the detected extension position and/or the correction for the seal frictions is effected inversely proportionally to the detected pressure and in dependence on a direction of a change in position.

The first loading state corresponds to a loading state without a load lifted by the lifting apparatus and the second loading state corresponds to a loading state with a lifted load. The reference phase would thus be carried out without the lifted load and the measurement phase would be carried out after a load has been lifted.

It should however not be excluded that the first loading state corresponds to a loading state with a first load lifted by the lifting apparatus and the second loading state corresponds to a loading state with a second lifted load preferably differing from the first. The reference phase would thus for example be carried out with a load which has already been lifted and the measurement phase would be effected after a load has been partially set down or additionally picked up.

As already stated in the opening part of this specification, a control means for a hydraulic lifting apparatus is adapted to carry out a method as described hereinbefore for determining a load which is lifted or is to be lifted.

Such a control means, in a first operating mode, can carry out the reference phase in a first loading state in the reference position of the lifting apparatus for first detection of the forces currently acting on the lifting apparatus and the current geometry of the lifting apparatus.

In a second operating mode the control means can carry out the measurement phase in a second loading state in the measurement position of the lifting apparatus for the second detection of the forces currently acting on the lifting apparatus and the current geometry of the lifting apparatus. The control means can for example be so adapted that after implementation of the reference phase in the first operating mode a switch into the second operating mode is automatically effected. It can also be provided for example that the position of the lifting apparatus in the second operating mode can be altered only within the tolerance range or a suitable warning signal is output by the control means prior to leaving the tolerance range.

In a third operating mode the control means can carry out the comparison phase for characterizing the lifted load by a comparison of the respective detected forces currently acting on the lifting apparatus and the respective detected current geometry of the lifting apparatus. In that respect it can be provided for example that, after the measurement phase has been carried out, a switch into the third operating mode is automatically effected and the comparison phase is possibly also automatically carried out.

In that respect, it can be advantageous if the load characterized in the comparison phase can be displayed at a display means communicating with the control means in units corresponding to the load. In that way for example a user can be given information about the load determined by the method, in units which the user can understand.

As already stated protection is finally also claimed for a hydraulic lifting apparatus having a control means as described hereinbefore. The hydraulic lifting apparatus can be in the form of a loading crane for a vehicle. Particularly advantageously the hydraulic lifting apparatus can be in the form of an articulated arm crane.

BRIEF DESCRIPTION OF DRAWINGS

Further details and advantages of the present invention are described more fully hereinafter by means of the specific description with reference to the embodiments by way of example illustrated in the drawings in which:

FIGS. 6a to 6c are further diagrammatic views of an implementation of a lifting operation.

DETAILED DESCRIPTION OF THE INVENTION

Figure 1A:
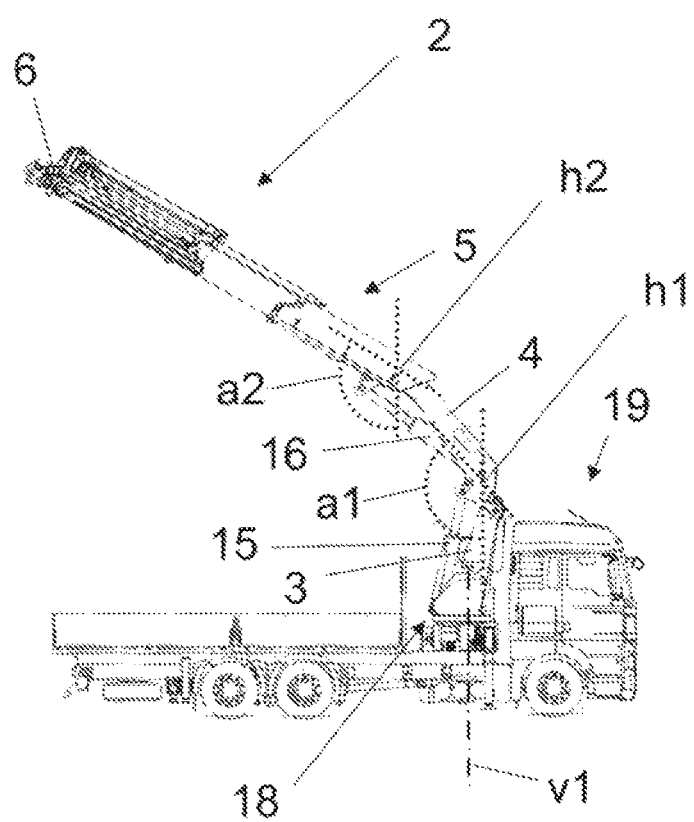
FIGS. 1a to 1c show side views of various embodiments of a lifting apparatus mounted on a vehicle.

FIG. 1a shows a first embodiment of the lifting apparatus 2, wherein the lifting apparatus 2 is in the form of a loading crane or articulated arm crane and is arranged on a vehicle 19. As shown the lifting apparatus has a crane column 3 rotatable about a first vertical axis v1 by means of a rotary mechanism 18, a main arm 4 mounted to the crane column 3 pivotably about a first horizontal pivot axis h1 and an articulated arm 5 mounted to the main arm 4 pivotably about a second horizontal pivot axis h2, with at least one crane extension arm 6. A hydraulic main cylinder 15 is provided for the pivotal movement of the main arm 4 relative to the crane column 3 (articulation angle a1). A hydraulic articulation cylinder 16 is provided for the pivotal movement of the articulated arm 5 relative to the main arm 4 (articulation angle a2).

Figure 1B:
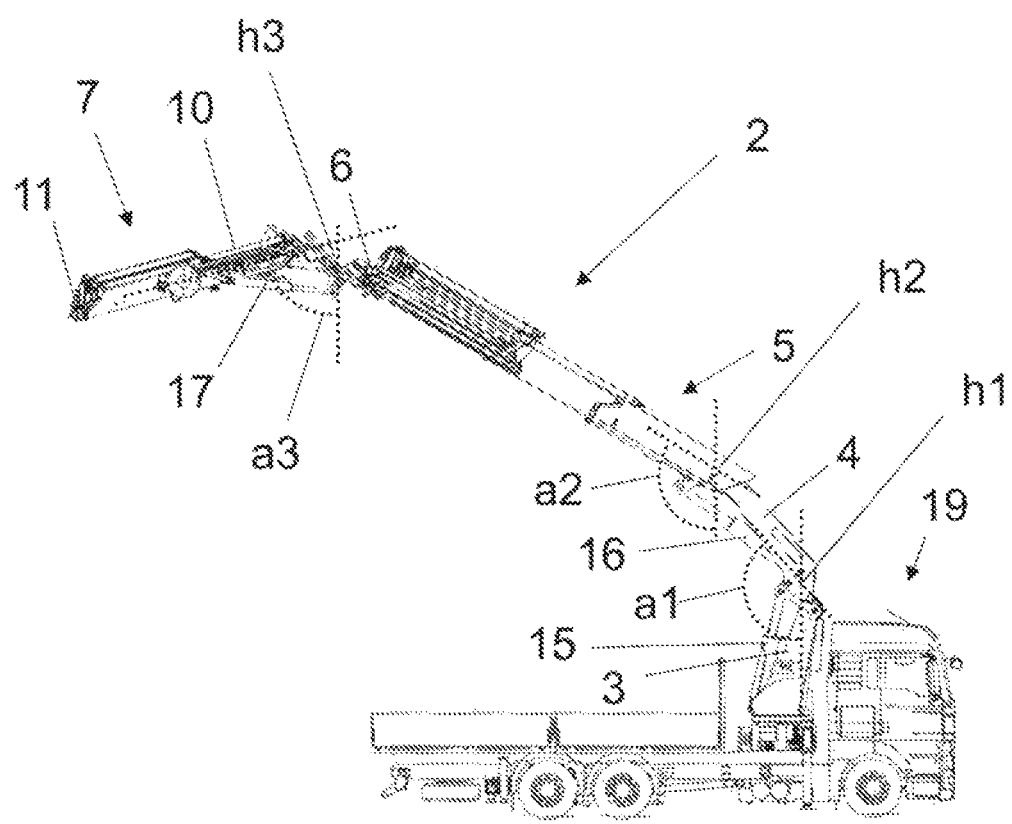

FIG. 1b shows a second embodiment of the lifting apparatus 2, wherein the lifting apparatus 2 shown therein, in addition to the configuration of the embodiment shown in FIG. 1a, has an attachment articulated arm 7 arranged on the crane extension arm 6 pivotably about a third horizontal pivot axis h3, with a crane arm 10 and a further crane extension arm 11. An articulation cylinder 17 is provided for pivotal movement of the attachment articulated arm 7 relative to the articulated arm 5 (articulation angle a3).

Figure 1C:
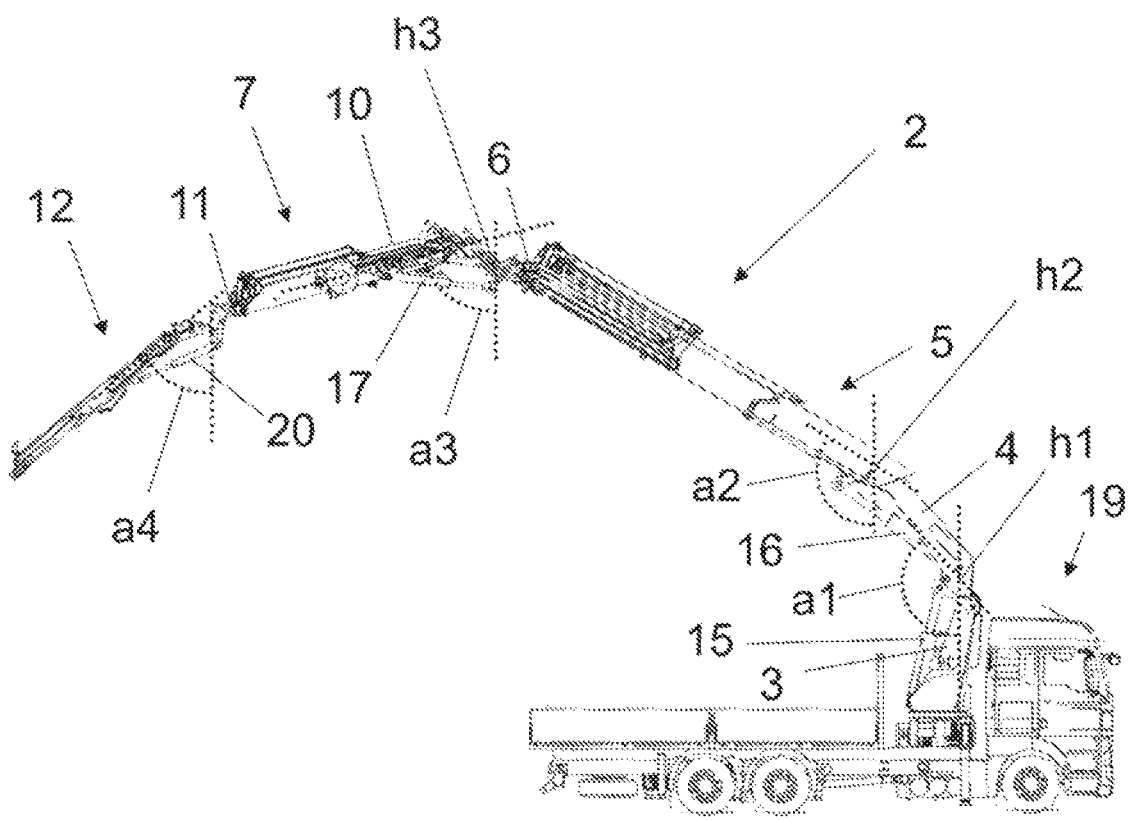

FIG. 1c shows a third embodiment of the lifting apparatus 2, wherein the lifting apparatus 2 shown therein, in addition to the configuration of the embodiment shown in FIG. 1b, has a further attachment articulated arm 12 mounted to the articulated extension arm 11 of the attachment articulated arm 7 pivotably about a fourth horizontal pivot axis a4. An articulation cylinder 20 is provided for the pivotal movement of the further attachment articulated arm 12 relative to the attachment articulated arm 7 (articulation angle a4).

It will be appreciated that all illustrated embodiments can have a rotary mechanism 18.

Figure 2A:
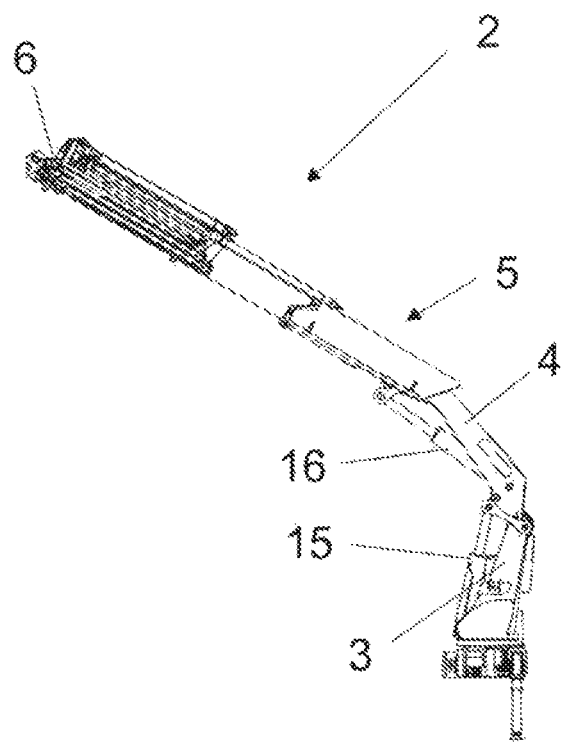
FIGS. 2a to 2c are side views of various embodiments of a lifting apparatus.
Figure 2B:
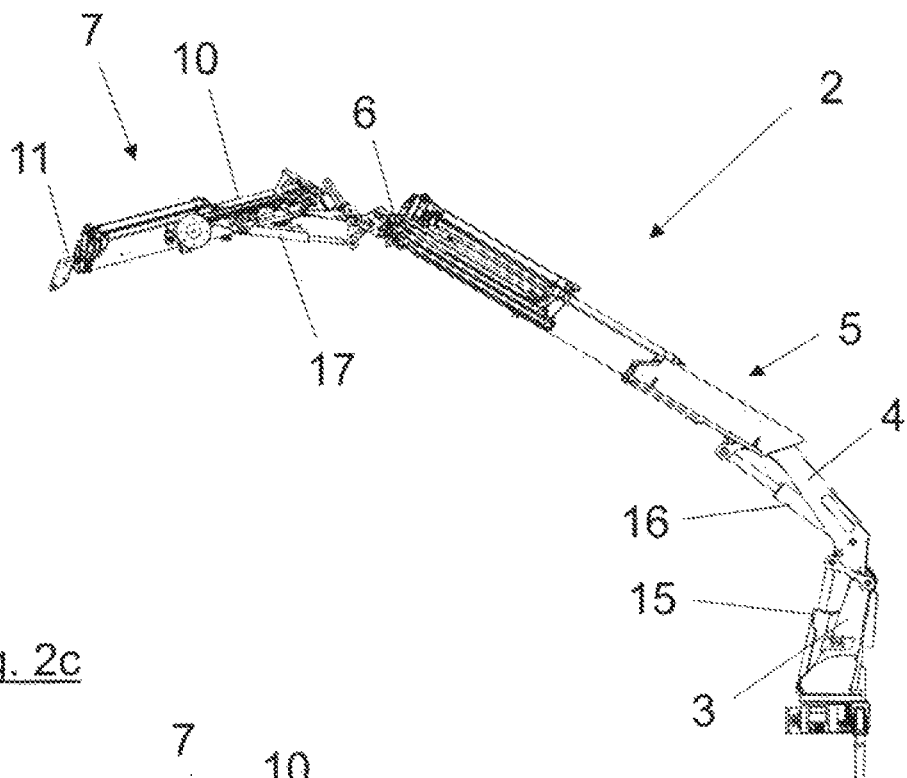
Figure 2C:
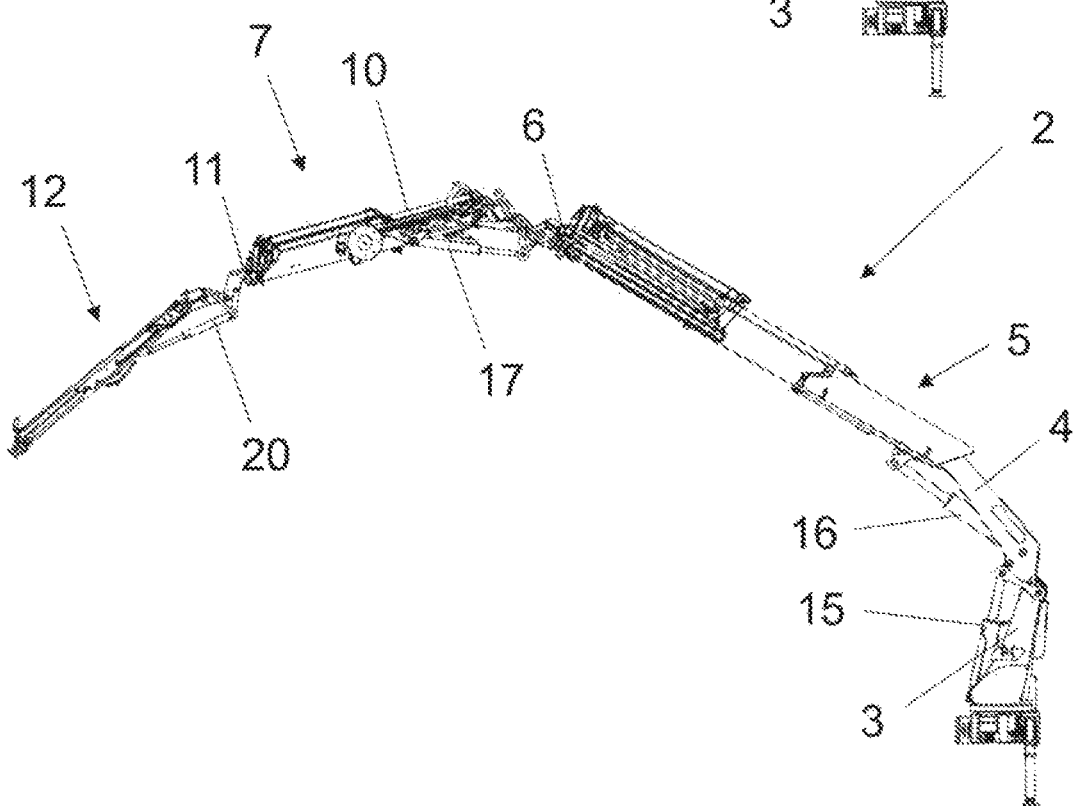

FIGS. 2a to 2c respectively show a detail view of a lifting apparatus 2 of a configuration as shown in FIGS. 1a to 1c.

Figure 3A:
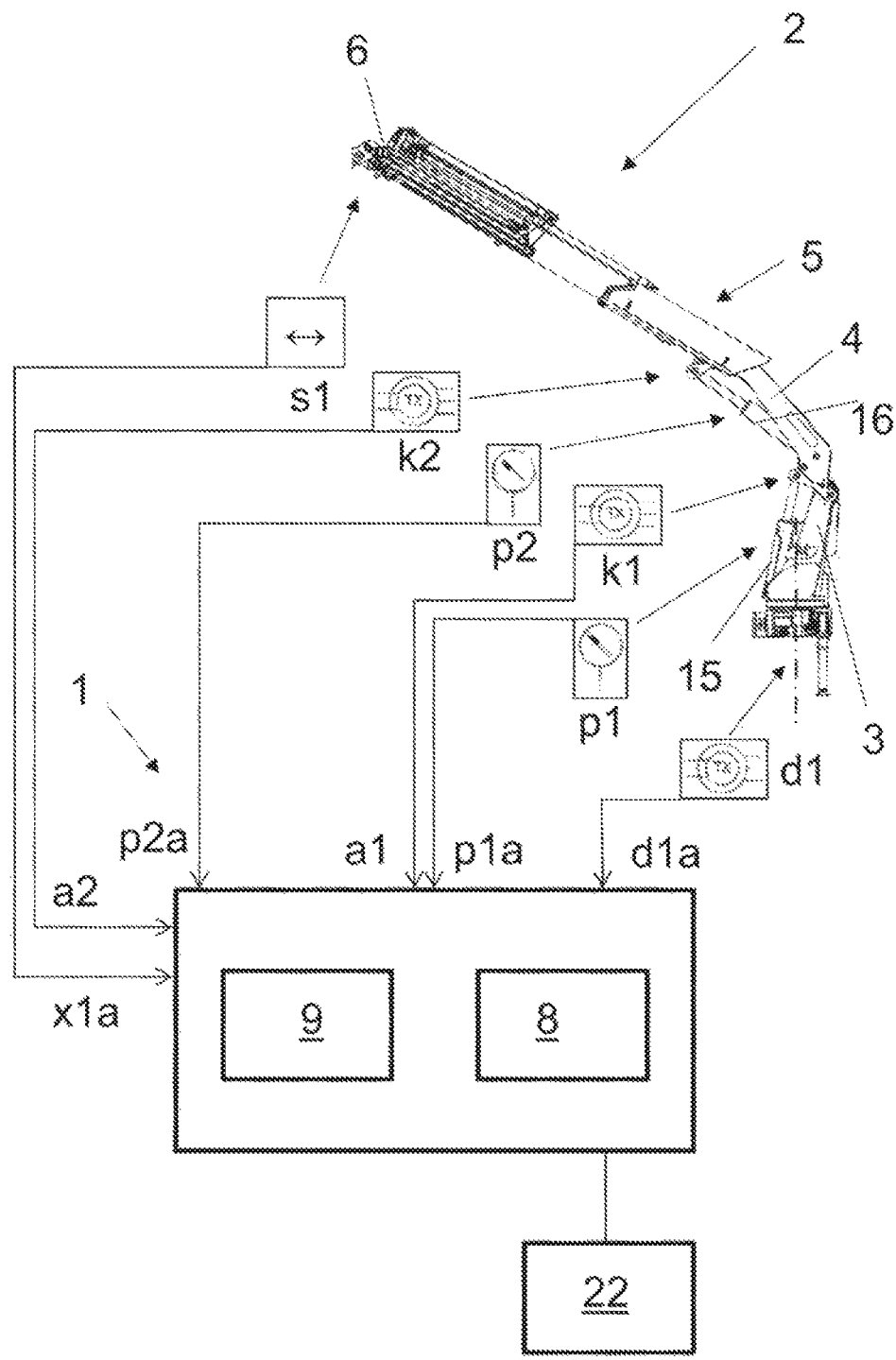
FIGS. 3a and 3b are side views of different embodiments of a lifting apparatus and a respective diagrammatic representation of a control means with sensor arrangement.

FIG. 3a shows an embodiment of the lifting apparatus 2 as shown in FIGS. 1a and 2a respectively. In addition there is shown a diagrammatic representation of a controller 1 adapted for carrying out a method of determining a load 21 which is lifted or is to be lifted by the lifting apparatus 2 (this is not shown here, see in that respect for example FIG. 4, 5 or 6). The controller 1 has a plurality of signal inputs to which signals of the sensor arrangement installed on the lifting apparatus 2 can be supplied. The control means 1 further has a storage means 9 in which for example program data relating to operating modes and calculation models of the control means 1 and incoming signals can be stored, and a computing unit 8 with which incoming signals and data stored in the storage means 9 can be processed. The controller 1 can also communicate with a display 22. The communication of the controller 1 with the display 22 can be wired and/or wireless. The sensor for detecting the geometry of the lifting apparatus 2, in the structure shown in FIG. 3a, includes a rotary angle sensor d1 for detecting the respective rotary angle dla, an articulation angle sensor k1 for detecting the articulation angle a1 of the main arm 4 relative to the crane column 3, an articulation angle sensor k2 for detecting the articulation angle a2 of the articulated arm 5 relative to the main arm 4 and an extension position sensor s1 for detecting the extension position of the crane extension arm 6. For detecting the forces acting on the lifting apparatus 2 there are provided a pressure sensor p1 for detecting the hydraulic pressure p1a in the main cylinder 15 and a pressure sensor p2 for detecting the hydraulic pressure p2a in the articulation cylinder 16.

Figure 3B:
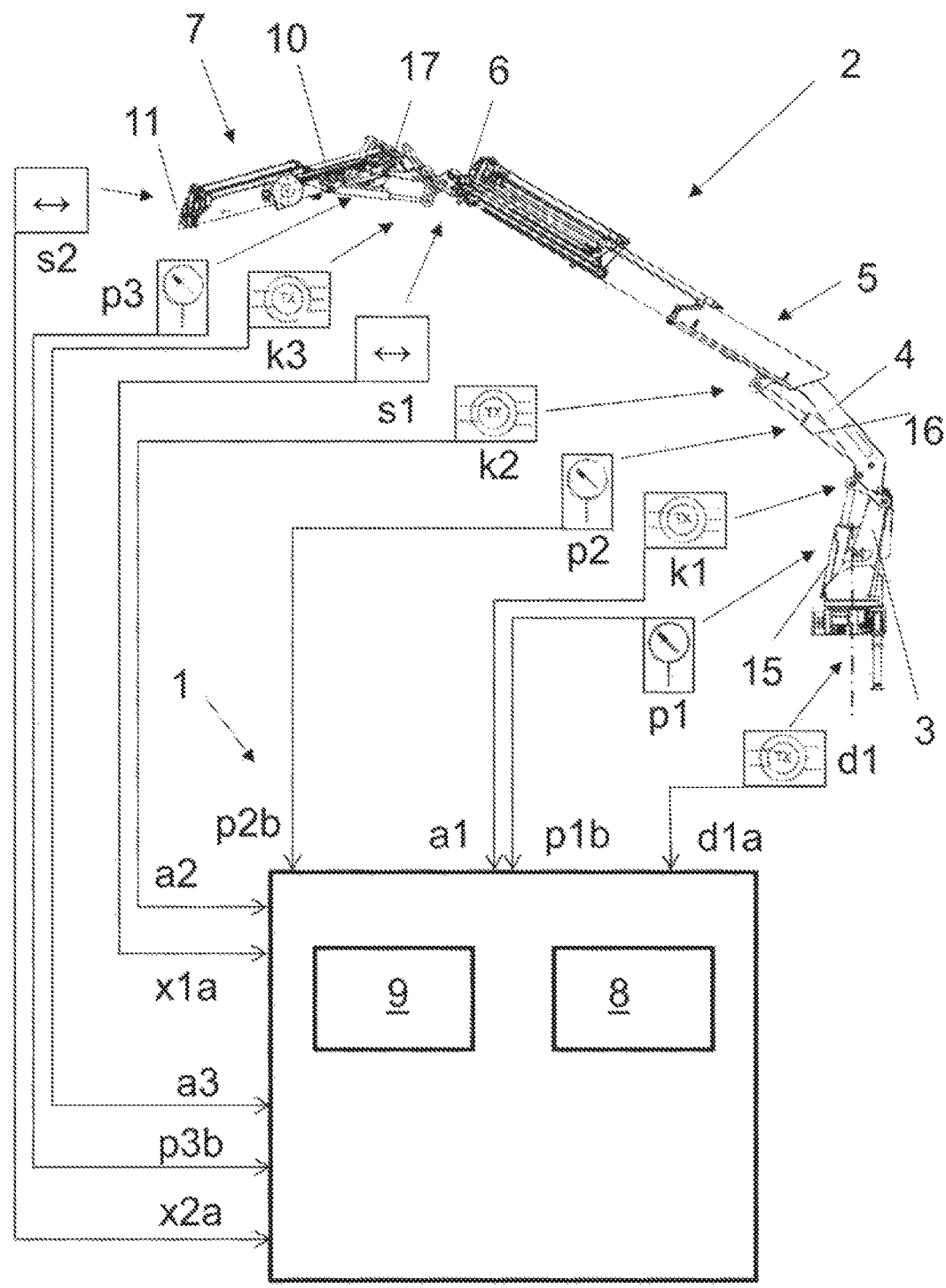

FIG. 3b, similarly to FIG. 3a, shows an embodiment of the lifting apparatus 2 as shown in FIG. 1b and FIG. 2b respectively. As shown the configuration of the lifting apparatus 2 includes an attachment articulated arm 7 arranged on the crane extension arm 6 of the articulated arm 5. Provided as an additional sensor arrangement for detecting parameters characteristic of the loading state of the lifting apparatus there are an articulation angle sensor k3 for detecting the articulation angle a3 of the attachment articulated arm 7 relative to the articulated arm 5, an extension position sensor s2 for detecting the extension position of the further crane extension arm 11 and a pressure sensor p3 for detecting the hydraulic pressure p3b in the articulation cylinder 17.

A similar configuration in respect of the arrangement shown in FIGS. 3a and 3b comprising a lifting apparatus 2 as shown in FIG. 1c or FIG. 2c respectively and a controller 1 is also conceivable.

In a method as described hereinbefore for determining a load 21 which is lifted or is to be lifted by the lifting apparatus 2 that sensor arrangement which is additional in relation to FIG. 3a, in a design configuration of the lifting apparatus 2 with an attachment articulated arm 7, is however not absolutely necessary as (possibly with a known extension of the attachment articulated arm 7) the load 21 which is lifted or is to be lifted can in principle be determined by determining the moment with respect to the first horizontal pivot axis h1. The additional sensor arrangement and the fact of taking account of the measurement values or parameters supplied thereby, in particular additional determination, which is possible therewith, of the moment with respect to the third horizontal pivot axis h3 can however contribute to enhanced accuracy of the determination result (measurement accuracy).

Figure 4A:
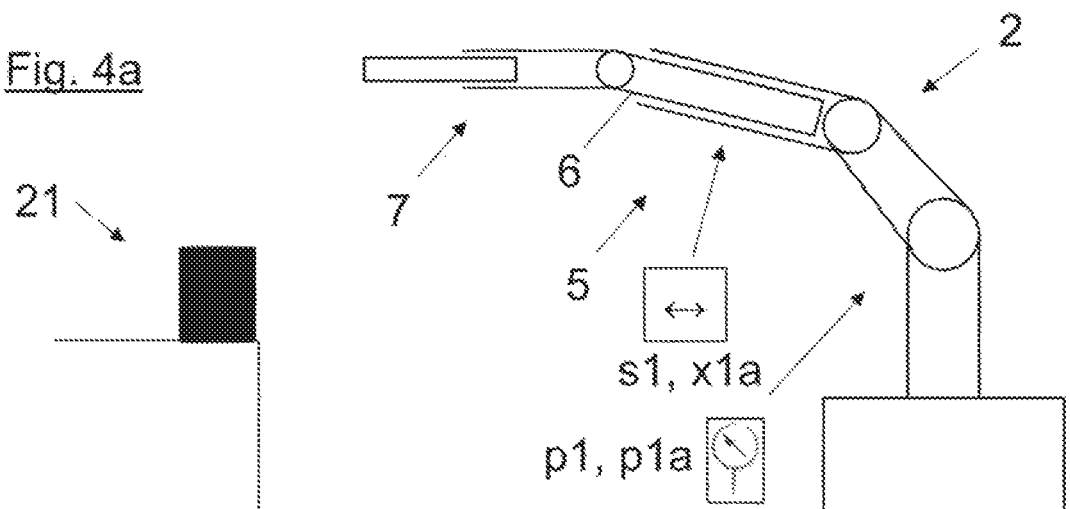
FIGS. 4a to 4c are a diagrammatic views of an implementation of a lifting operation.
Figure 4B:
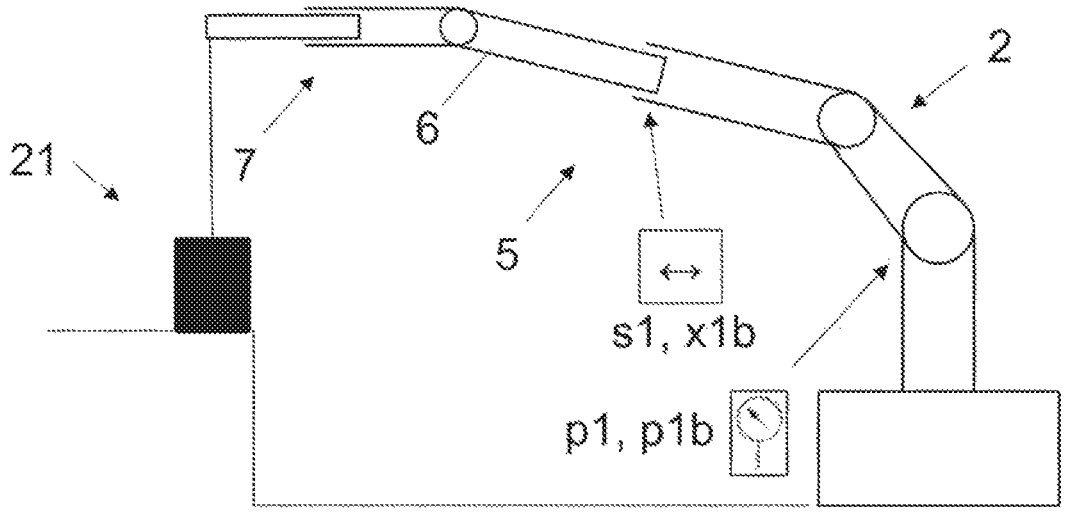
Figure 4C:
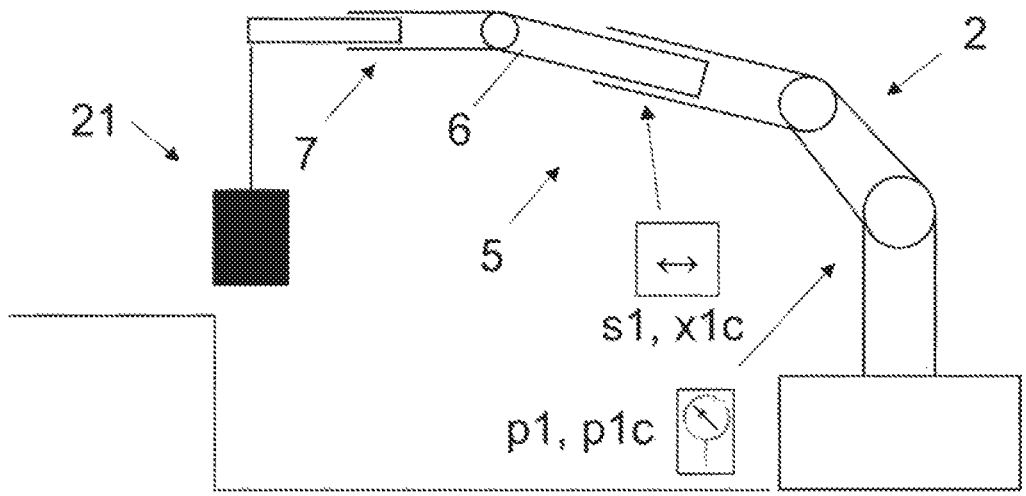

FIGS. 4a to 4c show an implementation of a load pickup (or in the reverse sequence the configuration of a load setdown) by the lifting apparatus 2. The position shown in FIG. 4a of the lifting apparatus 2 can in this case correspond to a reference position, wherein a substantially freely selectable position of the lifting apparatus 2 can serve as the reference position. Of the parameters characteristic of the loading state of the lifting apparatus 2, in the illustrated configuration of the load pickup operation only the extension position of the articulated arm 5 measured by the extension position sensor s1, and the hydraulic pressure in the main cylinder 15 measured by the pressure sensor p1, are considered. In the reference position, the first extension position x1a of the crane extension arm 6 and the first hydraulic pressure p1a are measured and stored in the storage means 8 of the controller 1 (not shown). For that purpose the controller 1 has a first operating mode for the first detection of the forces currently acting on the lifting apparatus 2 and the current geometry of the lifting apparatus 2.

From the reference position, the lifting apparatus is now moved into the intermediate position by a change in geometry, here by extension of the crane extension arm 6 of the articulated arm 5 into the second extension positions x1b. The intermediate position is suitable as shown for picking up the load 21. In principle, it will be appreciated that it is also possible for the position of the lifting apparatus 2 that is shown in FIG. 4b (before lifting the load 21) to serve as the reference position. In the intermediate position the second extension position x1b of the crane extension arm 6 and the second hydraulic pressure p1b are measured and also stored in the storage member 8 of the controller 1 (not shown). That can be effected generally for all lifting operations in an intermediate phase in which the controller 1 is in an operating mode suitable for same. In the intermediate position the load 21 is now attached to the lifting apparatus 2 and possibly also lifted. In principle, the lifted load 21 can now already be determined.

From the intermediate position the lifting apparatus 2 is moved into the measurement position by a change in geometry, here after lifting the load 21, by retraction of the crane extension arm 6 into the third extension positions x1c. As shown the measurement position is approached to the reference position. In that respect, it can be provided that a change in position or geometry of the lifting apparatus 2 must be within a tolerance range in order to be able to use the characteristic parameters detected in the reference phase for the forces currently acting on the lifting apparatus 2 and the current geometry of the lifting apparatus 2, for determining the lifted load 21. In that respect, the tolerance range can apply for a maximum permissible change in extension position and/or a maximum permissible change in articulation angle (see for example FIGS. 7a and 7b).

In FIG. 4c the lifting apparatus 2 is in the measurement position after lifting of the load 21. In the measurement position the third extension position x1c of the crane extension arm 6 and the third hydraulic pressure p1c are now measured and stored in the storage means 8 of the controller 1 (not shown). For that purpose, the controller 1 has a second operating mode for the second detection of the forces currently acting on the lifting apparatus 2 and the current geometry of the lifting apparatus 2.

In a comparison phase in which the controller 1 is in a third operating mode, characterization of the lifted load 21 is now effected by a comparison of the respective detected forces currently acting on the lifting apparatus 2 and the respective detected current geometry of the lifting apparatus 2. Detection of the forces currently acting on the lifting apparatus 2 and the current geometry of the lifting apparatus is generally advantageously effected in each case with involvement of parameters characteristic of the respective position of the lifting apparatus 2 and the respective loading state of the lifting apparatus 2 (for example pressures, extension positions, articulation angles and possible additional data relating to the configuration) and a calculation model stored in the storage member 8 of the controller 1.

Figure 5A:
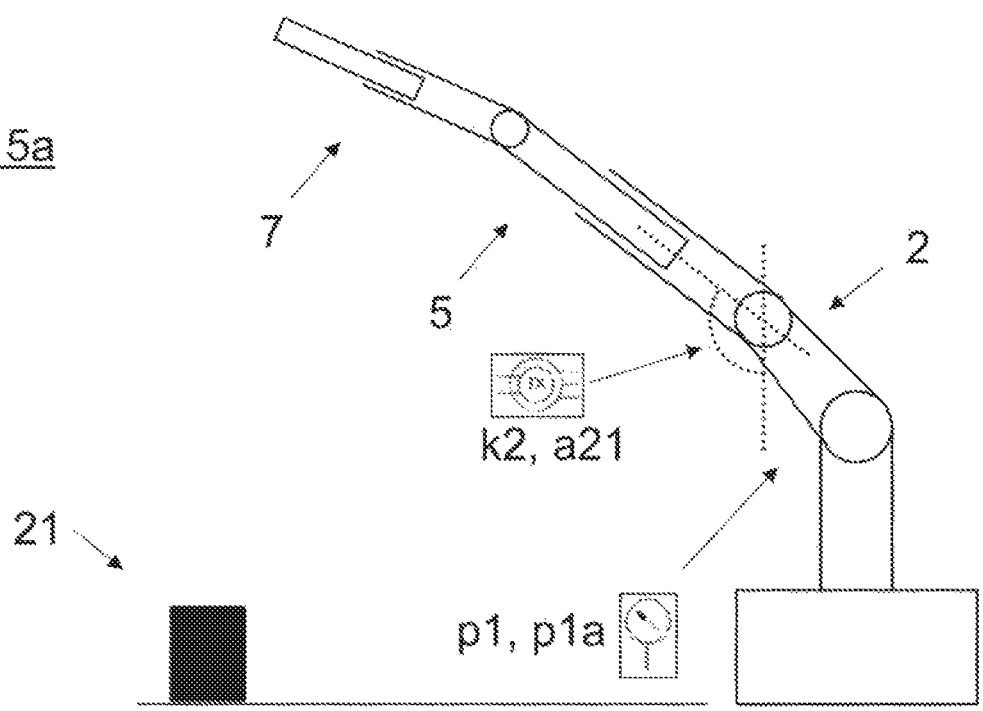
FIGS. 5a to 5c are further diagrammatic views of an implementation of a lifting operation.
Figure 5B:
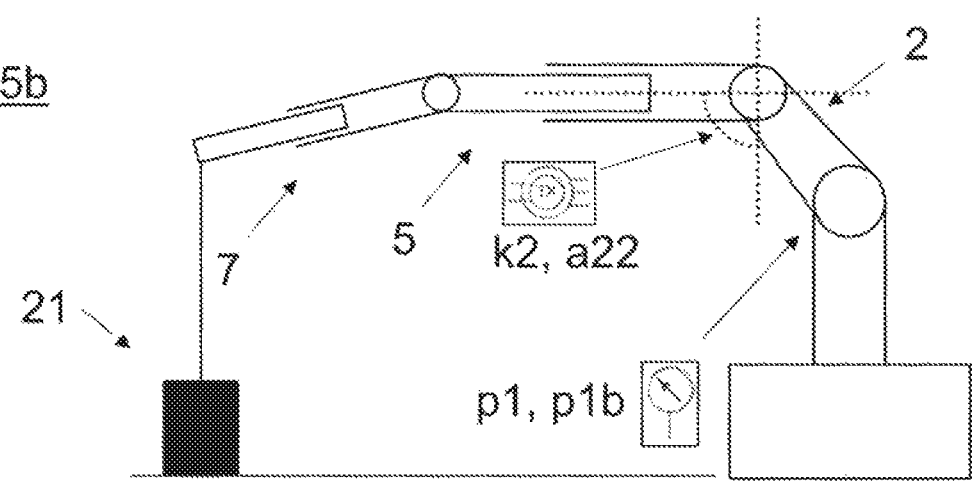
Figure 5C:
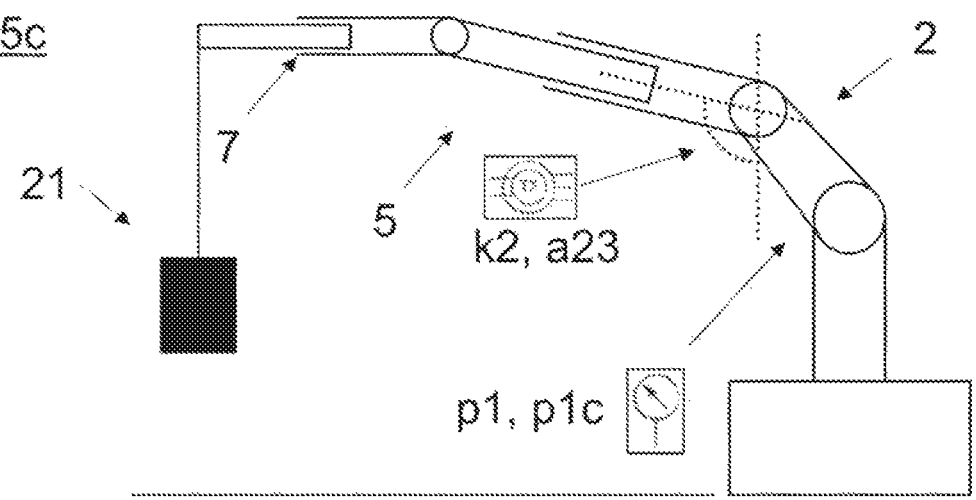

FIGS. 5a to 5c show a further implementation of a load pickup (or in the reverse sequence the implementation of a load setdown) by the lifting apparatus 2. Load pickup of the load 21 by the lifting apparatus 2 is effected as shown by a pivotal movement of the articulated arm 5 relative to the main arm 4. Of the parameters characteristic of the loading state of the lifting apparatus 2 only the articulation angle of the articulated arm 5, that is measured by the articulation angle sensor k2, and the hydraulic pressure in the main cylinder 15, that is measured by the pressure sensor p1, are considered in the illustrated performance of load pickup.

In the reference position shown in FIG. 5a the first articulation angle position a21 of the articulated arm 5 and the first hydraulic pressure p1a are measured and stored in the storage means 8 of the controller 1 (not shown) (reference phase, controller 1 in the first operating mode). The lifting apparatus 2 is moved into the intermediate position shown in FIG. 5b by a change in geometry, here a pivotal movement of the articulated arm 5. In the intermediate position the second articulation angle position a22 of the articulated arm 5 and the second hydraulic pressure p1b are measured and also stored in the storage means 8 of the controller 1 (not shown). As previously in this case too the position of the lifting apparatus 2 shown in FIG. 5b can serve as the reference position. By a further change in geometry, here once again a pivotal movement of the articulated arm 5, the lifting apparatus 2 is moved into the measurement position shown in FIG. 5c, whereby lifting of the load 21 is also effected. In the measurement position, the third articulation angle position a23 of the articulated arm 5 and the third hydraulic pressure p1c are now measured and stored in the storage member 8 of the controller 1 (not shown) (measurement phase, controller 1 in the second operating mode). In the subsequent comparison phase (controller 1 in the third operating mode), the lifted load 21 can again be characterized by the controller 1.

Figure 6A:
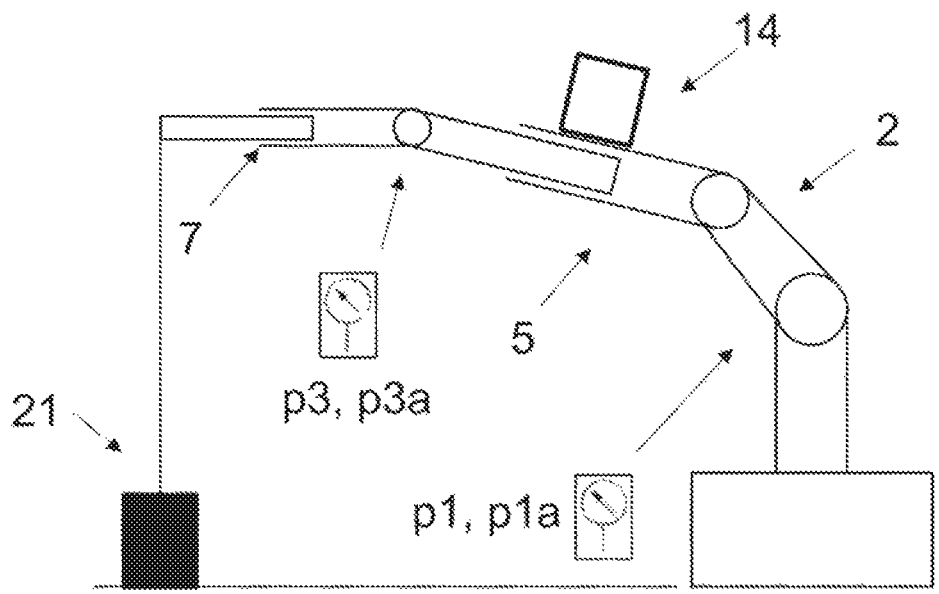
Figure 6B:
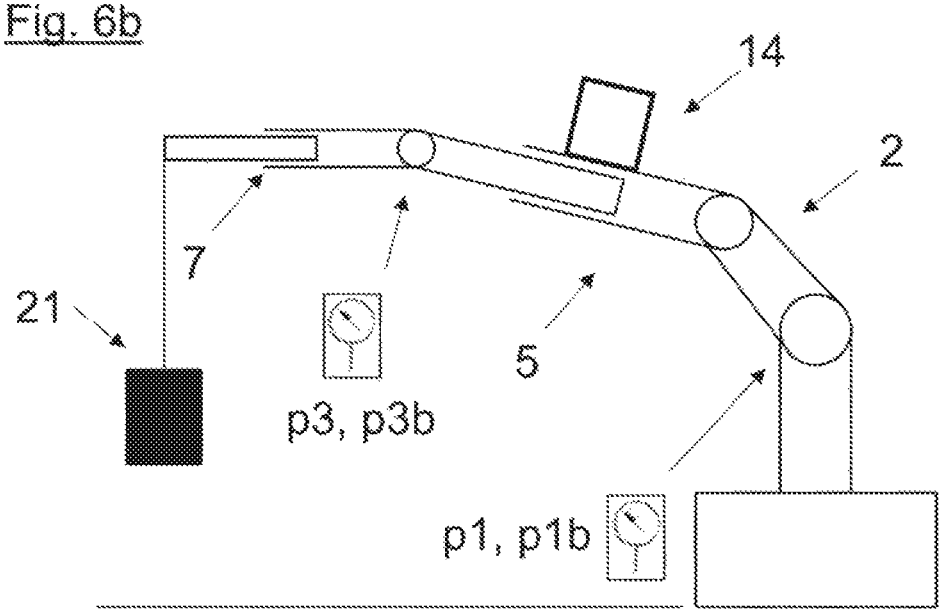

FIGS. 6a and 6b show a further implementation of a load pic up (or in the reverse sequence the implementation of a load setdown) by the lifting apparatus 2, wherein the lifting apparatus 2 has an additional working device 14 arranged on the articulated arm 5, in the form of a cable winch. Pickup of the load 21 by the lifting apparatus 2 is effected by means of the working device 14 in the form of a cable winch. Of the parameters characteristic of the loading state of the lifting apparatus 2 only the hydraulic pressure in the main cylinder 15, measured by the pressure sensor p1, and the hydraulic pressure in the articulation cylinder 17, that is measured by the pressure sensor p3, are considered in the illustrated implementation of load pickup. In FIG. 6a the lifting apparatus 2 is in the reference position which is already suitable for load pickup. In FIG. 6b the lifting apparatus 2, after the load has been picked up, is in the measurement position, that in the illustrated situation substantially corresponding to the reference position. By a comparison of the pressures p1a, p3a recorded in the reference phase and the pressures p1b, p3b recorded in the measurement phase it is possible (with an adequately determined geometry) to arrive at a conclusion about the change in loading of the lifting apparatus 2, and thus the lifted load 21 can be characterized.

In principle by means of the above-described method it is possible to determine a load which is lifted or is to be lifted by the lifting apparatus 2 in any combination of changes in geometry—in particular in any combination of the changes in geometry shown in the Figures described—.

In FIGS. 4, 5 and 6 it is respectively self-evident that, for the illustrated positions of the lifting apparatus 2, detection of the current geometry—therefore specifically detection of the characteristic parameters relevant to the current geometry (for example rotary angle, articulation angle and extension positions) is respectively effected. In the configurations of the lifting apparatus 2 having an attachment articulated arm 7 (frequently referred to as the jib) the characteristic parameters detected for that attachment articulated arm 7 can also be incorporated for determining the load 21 which is lifted or is to be lifted.

Figure 7A:
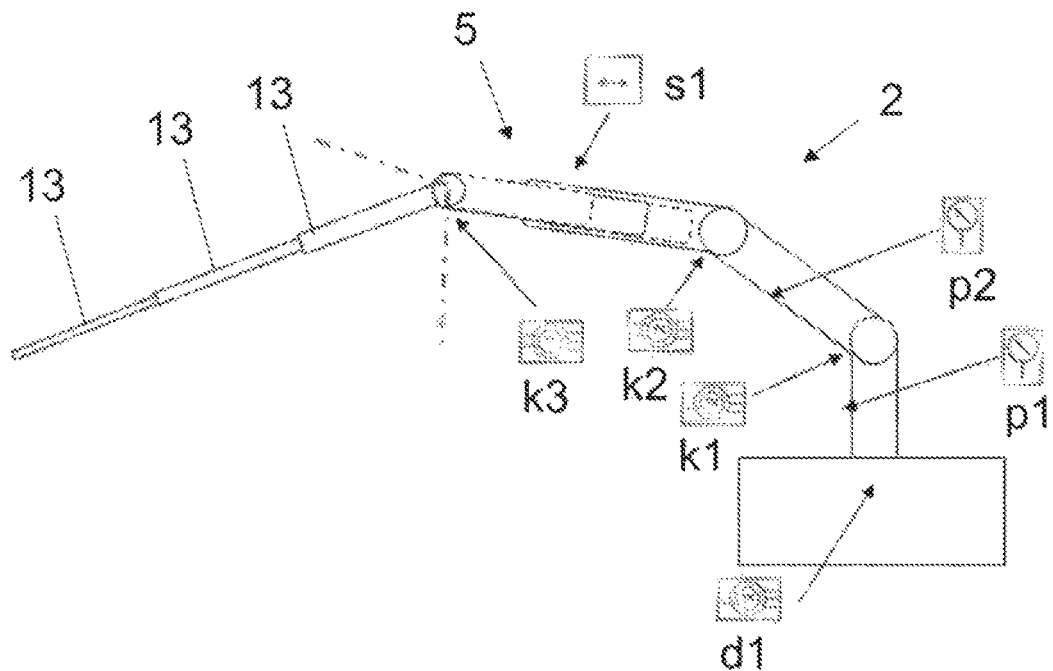
FIGS. 7a and 7b are diagrammatic views of various embodiments of a lifting apparatus and a respective representation of the tolerance range.
Figure 7B:
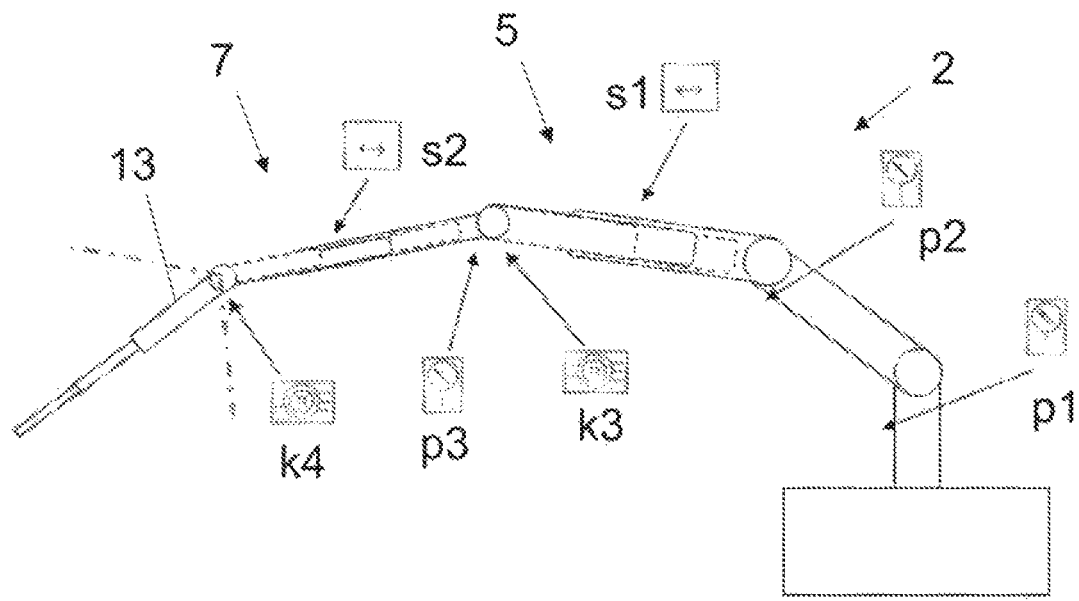

FIGS. 7a and 7b each show a diagrammatic configuration of a lifting apparatus 2 with manually actuable, static fly jibs 13 arranged thereon.

In the structure shown in FIG. 7a the fly jibs 13 are arranged on the articulated arm 5. In that case the fly jibs 13 can be arranged pivotably on the articulated arm 5, wherein the articulation angle of the fly jibs 13 can be detected by means of an articulation angle sensor k3. Information relating to the additional displacement of the fly jibs 13 can be stored in the storage means 8 of the controller 1 and incorporated into the operation of determining a load 21 which is lifted or is to be lifted. In addition FIG. 7a indicates in broken lines the respective tolerance range for the change in extension position of the articulated arm 5 and the change in articulation angle of the fly jibs 13.

In the structure shown in FIG. 7b the fly jibs 13 are arranged on an attachment articulated arm 7 disposed on the articulated arm 5. In that case the fly jibs 13 can be arranged pivotably on the attachment articulated arm 7, wherein the articulation angle of the fly jibs 13 can be detected by means of an articulation angle sensor k4. FIG. 7b also indicates in broken lines the respective tolerance range for the change in extension position of the articulated arm 5, the attachment articulated arm 7 and the change in articulation angle of the fly jibs 13.

In a particularly advantageous configuration of the lifting apparatus 2 the tolerance range can substantially embrace the entire range of movement of the lifting apparatus 2.

Figure 8A:
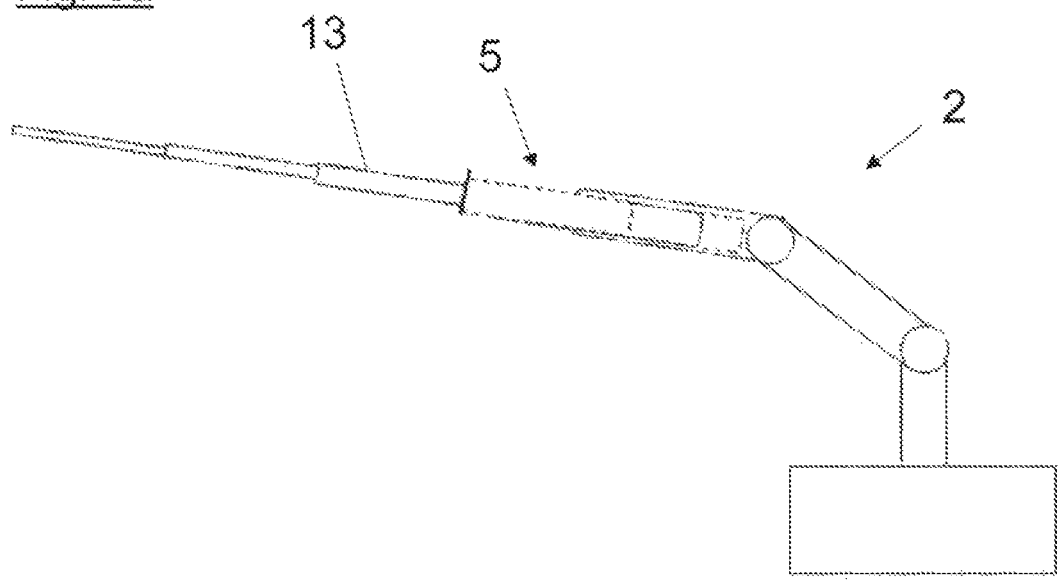
FIGS. 8a and 8b are diagrammatic views of various embodiments of a lifting apparatus with fly jib.
Figure 8B:
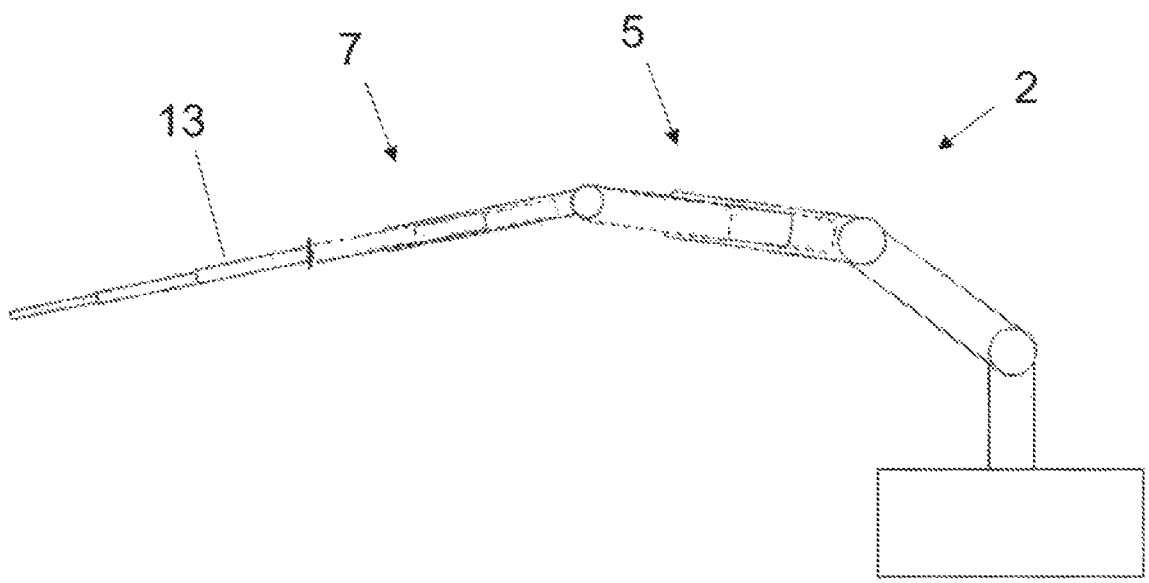

FIGS. 8a and 8b show an embodiment of the lifting apparatus 2 that is similar to FIGS. 7a and 7b, but therein the fly jibs 13 are mounted to the articulated arm 5 and the attachment articulated arm 7 respectively at a predetermined, invariable articulation angle.

Figure 9A:
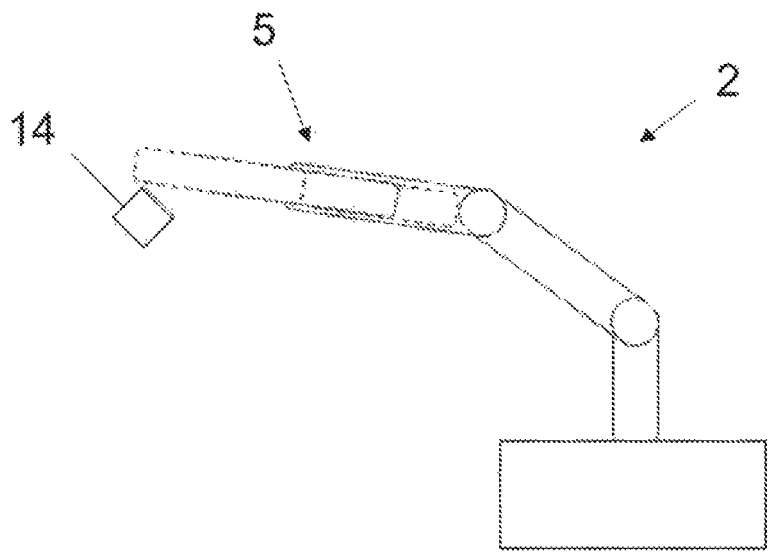
FIGS. 9a and 9b are diagrammatic views of various embodiments of a lifting apparatus with a working device.
Figure 9B:
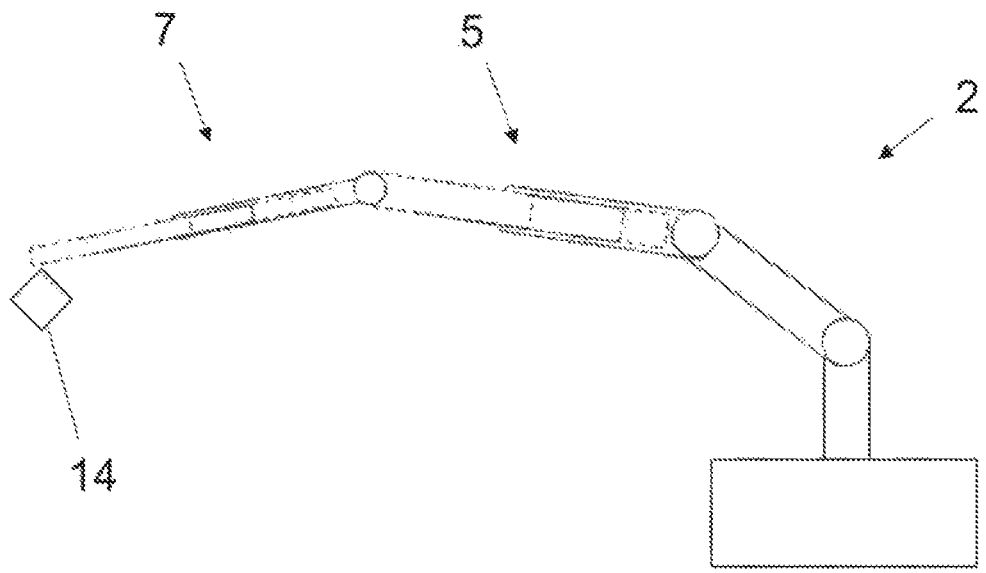

FIGS. 9a and 9b each shown an embodiment of the lifting apparatus 2 with a working device 14 arranged thereon, for example in the form of a gripping means or grab. In FIG. 9a the working device 14 is arranged on the articulated arm 5 while in FIG. 9b the working device 14 is arranged on the attachment articulated arm 7. Optionally an angular position of the working device 14 related to the crane arm carrying same can be detected and also taken into consideration when determining a lifted load 21. As, in the case of the above-described method, in the reference phase and in the measurement phase, the loading of the lifting apparatus 2 that is caused by the working device 14 is detected, that can be incorporated in the calculation model.

Figure 10A:
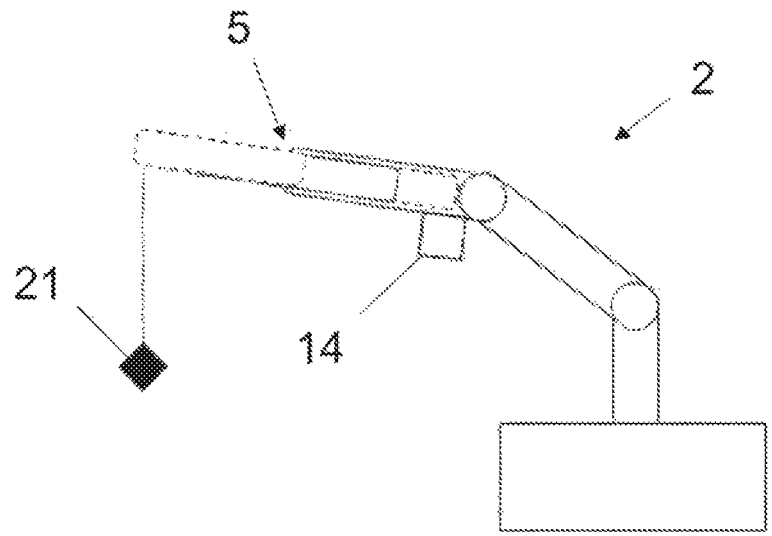
FIGS. 10a and 10b are diagrammatic views of various embodiments of a lifting apparatus with a respective cable winch arranged at different positions.
Figure 10B:
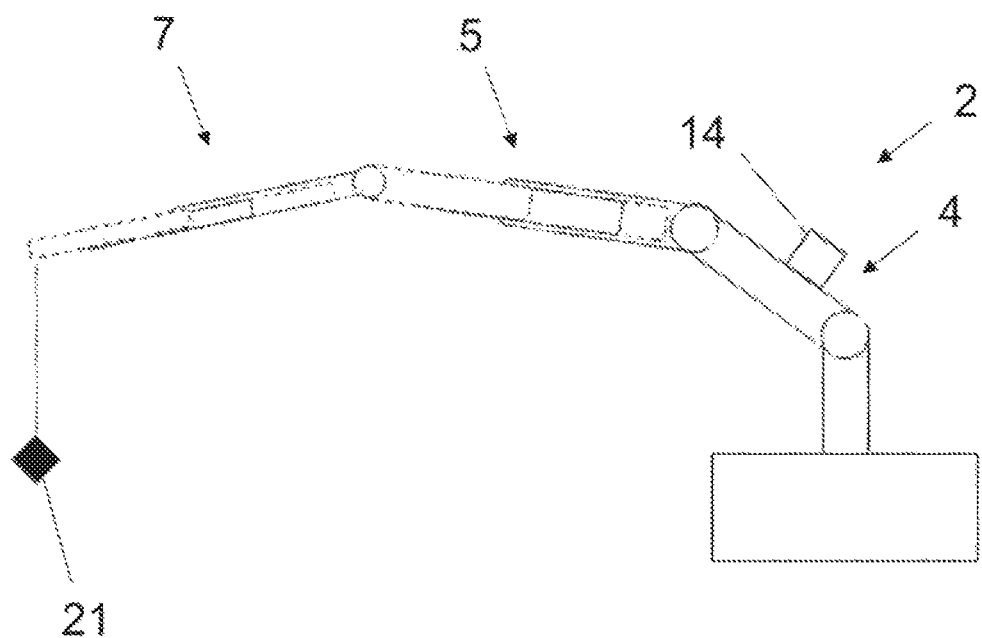

FIGS. 10a and 10b each shown an embodiment of the lifting apparatus 2 with a working device 14 arranged thereon, here in the form of a cable winch, and a load 21 lifted by the lifting apparatus 2. In FIG. 10a the working device 14 is arranged on the articulated arm 5 while in FIG. 10b the working device 14 is arranged on the main arm 4. As in the above-described method in the reference phase and in the measurement phase the loading of the lifting apparatus 2 caused by the working device 14 is detected, substantially independently of the position thereof on the lifting apparatus 2, that can be incorporated in the calculation.

The functionality of determining a load 21 which is lifted or is to be lifted by the lifting apparatus 2 is therefore not limited by the layout or configuration of the lifting apparatus 2.

LIST OF REFERENCES 1 controller
2 lifting apparatus
3 crane column
4 main arm
a1, a2, a3, a4 articulation angle
5 articulated arm
6 crane extension arm
7 attachment articulated arm
s1, s2 extension position sensor
x1a, x2b, x3c extension positions
p1, p2, p3 pressure sensors
p1a, p1b, p1c pressures
p3a, p3b pressures
8 storage means
9 computing unit
k1, k2, k3, k4 articulation angle sensor
d1 rotary angle sensor
a21, a22, a23 articulation angle
d1a rotary angle
10 crane arm
11 crane extension arm
12 attachment extension arm
13 fly jib
14 working device
15 main cylinder
16, 17, 20 articulation cylinder
18 rotary mechanism
19 vehicle 22 display device
h1, h2, h3 horizontal pivot axis
v1 vertical pivot axis
21 load

The invention claimed is:

1. A method of determining a load lifted or to be lifted in a lifting operation by a hydraulic lifting apparatus, the method comprising:
   determining the load lifted or to be lifted based on operating parameters currently prevailing in the lifting operation of the hydraulic lifting apparatus;
   during the lifting operation, moving the hydraulic lifting apparatus for determining the load into a reference position in a reference phase in a first loading state of the hydraulic lifting apparatus;
   performing a first detection of forces currently acting on the hydraulic lifting apparatus and the current geometry of the hydraulic lifting apparatus in the reference position of the reference phase, wherein the reference position corresponds to a freely selectable position of the hydraulic lifting apparatus;
   in a measurement phase of the lifting operation, moving the hydraulic lifting apparatus into a measurement position in a second loading state, and performing a second detection of forces currently acting on the hydraulic lifting apparatus and the current geometry of the hydraulic lifting apparatus in the measurement position;
   in a comparison phase of the lifting operation, characterizing the lifted load by comparing respective detected forces currently acting on the hydraulic lifting apparatus in the lifting operation and respective detected current geometry of the hydraulic lifting apparatus in the lifting operation; and
   attributing differences arising in the comparison phase in respect of the detected forces to a change in a loading state of the hydraulic lifting apparatus in the lifting operation.

2. The method according to claim 1, wherein the measurement position corresponds to a position of the hydraulic lifting apparatus after a load pickup or a load setdown.

3. The method according to claim 1, wherein the measurement position corresponds to a position of the hydraulic lifting apparatus, approximated to the reference position of the hydraulic lifting apparatus.

4. The method according to claim 1, wherein the measurement position of the hydraulic lifting apparatus substantially corresponds to the reference position.

5. The method according to claim 1, wherein the reference position corresponds to a position approximated to an intermediate position, wherein the intermediate position is a position of the hydraulic lifting apparatus suitable for load pickup or load setdown.

6. The method according to claim 5, further comprising performing transfer of the hydraulic lifting apparatus out of the reference position into the intermediate position and transfer of the hydraulic lifting apparatus out of the intermediate position into the measurement position with a change in position of the hydraulic lifting apparatus within a tolerance range.

7. The method according to claim 1, further comprising, prior to each implementation of the measurement phase for detection of the forces currently acting on the lifting apparatus in the second loading state and the current geometry of the lifting apparatus, performing an implementation of the reference phase for detecting the forces currently acting on the lifting apparatus in the first loading state and the current geometry of the lifting apparatus.

8. The method according to claim 1, wherein the lifting apparatus has a crane column rotatable about a vertical axis of rotation, and a main arm mounted to the crane column pivotably about a horizontal pivot axis, wherein the lifting apparatus further has a hydraulic main cylinder for pivotal movement of the main arm, wherein in the reference phase and the measurement phase a moment is detected in relation to the horizontal pivot axis.

9. The method according to claim 8, wherein the lifting apparatus has a rotary mechanism for rotation of the crane column, and an articulated arm mounted to the main arm pivotably about a second horizontal axis of rotation and with a crane extension arm, wherein the lifting apparatus further has a hydraulic articulation cylinder for effecting pivotal movement of the articulated arm and a hydraulic extension cylinder for actuation of the crane extension arm.

10. The method according to claim 1, wherein the performing of the detection of the forces currently acting on the lifting apparatus and the current geometry of the lifting apparatus involves parameters characteristic of the respective position of the lifting apparatus and the respective loading state of the lifting apparatus, and a calculation model.

11. The method according to claim 10, wherein the characteristic parameters of the lifting apparatus include at least a pressure in a main cylinder and/or a pressure in an articulation cylinder and/or a rotary angle of a rotary mechanism and/or an articulation angle of a main arm relative to the crane column and/or an articulation angle of an articulated arm relative to the main arm and/or an extension position of a crane extension arm.

12. The method according to claim 10, wherein the lifting apparatus further has an attachment articulated arm mounted to the articulated arm pivotably about a horizontal pivot axis, and has a crane extension arm, wherein the lifting apparatus further has a hydraulic articulation cylinder for effecting pivotal movement of the attachment articulated arm, and characteristic parameters of the lifting apparatus include a pressure in an articulation cylinder and/or an articulation angle of the attachment articulated arm relative to the articulated arm and/or an extension position of the crane extension arm of the attachment articulated arm, wherein in the reference phase and the measurement phase, a moment is detected in relation to a first horizontal pivot axis about which a main arm is pivotably mounted to a crane column and a moment is detected in relation to the horizontal pivot axis about which the attachment articulated arm is pivotably mounted to the articulated arm.

13. The method according to claim 10, wherein the lifting apparatus further includes a fly jib arranged on a crane extension arm at a predeterminable angle, and the additional displacement of the fly jib is incorporated in the calculation model.

14. The method according to claim 10, wherein the lifting apparatus further has a working device arranged on a crane extension arm, and the additional loading due to the working device is incorporated in the calculation model.

15. The method according to claim 10, wherein a deformation of the lifting apparatus is incorporated in the calculation model.

16. The method according to claim 15, wherein a deformation of the crane column and/or a main arm and/or an articulated arm and/or an attachment articulated arm and/or a crane extension arm of the lifting apparatus and/or a fly jib and/or an influence of seal frictions of the hydraulic cylinders are incorporated in the calculation model.

17. The method according to claim 16, wherein, in the calculation model, a deformation in the form of a correction to detected articulation angles and/or in the form of a correction to detected extension positions is applied, and/or an influence of the seal frictions is applied in the form of a correction to detected pressures.

18. The method according to claim 17, wherein the correction is effected based on the detected forces currently acting on the lifting apparatus and/or detected articulation angles and/or the detected extension positions.

19. The method according to claim 17, wherein the correction for the deformation is performed in linear dependency in respect of the detected pressure and/or in linear dependency in respect of the detected extension position and/or the correction for the seal frictions is effected inversely proportionally to the detected pressure and in dependence on a direction of a change in position.

20. The method according to claim 1, wherein the first loading state corresponds to a loading state without a load lifted by the lifting apparatus, and the second loading state corresponds to a loading state with a lifted load.

21. The method according to claim 1, wherein the first loading state corresponds to a loading state with a first load lifted by the lifting apparatus, and the second loading state corresponds to a loading state with a second lifted load differing from the first.

22. A controller for a hydraulic lifting apparatus configured to carry out the method according to claim 1 for determining the load lifted or to be lifted, the controller is configured to:
in a first operating mode, carry out the reference phase in the first loading state in the reference position of the lifting apparatus for the first detection of the forces currently acting on the lifting apparatus and the current geometry of the lifting apparatus, in a second operating mode, carry out the measurement phase in the second loading state in the measurement position of the lifting apparatus for the second detection of the forces currently acting on the lifting apparatus and the current geometry of the lifting apparatus, and in a third operating mode, carry out the comparison phase for characterizing the lifted load by comparing the respective detected forces currently acting on the lifting apparatus and the respective detected current geometry of the lifting apparatus.

23. The controller according to claim 22, wherein the controller is further configured to display load characterized in the comparison phase at a display unit communicating with the controller in units corresponding to the load.

24. A hydraulic loading crane for a vehicle comprising the controller according to claim 22.

* * * * *